(12) United States Patent
Benisty et al.

(10) Patent No.: US 12,481,460 B2
(45) Date of Patent: Nov. 25, 2025

(54) THIN PROVISIONING L2P RESOURCE SHARING

(71) Applicant: Sandisk Technologies, Inc., Milpitas, CA (US)

(72) Inventors: Shay Benisty, Beer Sheva (IL); Ariel Navon, Revava (IL)

(73) Assignee: SanDisk Technologies, Inc., Milpitas, CA (US)

( * ) Notice: Subject to any disclaimer, the term of this patent is extended or adjusted under 35 U.S.C. 154(b) by 18 days.

(21) Appl. No.: 18/582,483

(22) Filed: Feb. 20, 2024

(65) Prior Publication Data

US 2025/0265016 A1    Aug. 21, 2025

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0631* (2013.01); *G06F 3/067* (2013.01)

(58) Field of Classification Search
CPC ......... G06F 12/0246; G06F 2212/7201; G06F 12/10; G06F 2212/1024; G06F 3/0659; G06F 3/0679; G06F 2212/1036; G06F 2212/152; G06F 2212/214; G06F 2212/651; G06F 2212/7202; G06F 2212/7203; G06F 3/0616; G06F 3/0631; G06F 3/0644; G06F 3/0656; G06F 3/0665; G06F 3/0604; G06F 3/0619; G06F 3/0625; G06F 3/0634; G06F 3/0683
See application file for complete search history.

(56) References Cited

U.S. PATENT DOCUMENTS

| | | | |
|---|---|---|---|
| 9,436,399 B2 | 9/2016 | Garson et al. | |
| 10,521,131 B2 | 12/2019 | Yamamoto | |
| 11,340,810 B2 | 5/2022 | Navon et al. | |
| 11,650,917 B2 | 5/2023 | Brandt | |
| 11,650,920 B1 | 5/2023 | Shatsky et al. | |
| 11,663,136 B2 | 5/2023 | Xie et al. | |
| 2014/0372668 A1* | 12/2014 | Yeh | G06F 12/0246 711/103 |
| 2015/0095555 A1 | 4/2015 | Asnaashari et al. | |
| 2022/0012182 A1* | 1/2022 | Wei | G06F 12/0246 |
| 2023/0143926 A1 | 5/2023 | Inbar et al. | |

OTHER PUBLICATIONS

N-able, "Thin Provisioning Explained", Aug. 12, 2019.
Navon et al., U.S. Appl. No. 18/811,536, filed Aug. 21, 2024.

* cited by examiner

*Primary Examiner* — Yong J Choe
(74) *Attorney, Agent, or Firm* — Patterson + Sheridan, LLP

(57) ABSTRACT

Logical to physical (L2P) tables are implemented in solid state drives (SSDs) to hold L2P address translations. In a thin provisioning or thin storage system, the L2P table is sized to support the total amount of memory that is available to be allocated on a per client or per host basis. During thin provisioning, the total amount of memory is not typically utilized. As such, the L2P table, which is sized to accommodate full usage of the memory allocated, is not fully utilized resulting in unused portions of the L2P table. The unused portions of the L2P table can be reallocated to use as temporal buffers until needed for write commands. Due to the reallocation, less buffers are needed.

19 Claims, 6 Drawing Sheets

THIN PROVISIONING L2P RESOURCE SHARING

BACKGROUND OF THE DISCLOSURE

Field of the Disclosure

Embodiments of the present disclosure generally relate to efficient logical to physical (L2P) table usage in thin provisioning or thin storage systems.

Description of the Related Art

Thick and thin provisioning represent the two rival ways to allocate storage space in centralized disk storage systems, storage area networks (SANs), and storage virtualization systems.

Thick provisioning, also known as fat provisioning, is the more conventional method. Using thick provisioning, storage space on physical media is allocated to particular users (e.g., host devices, clients, or client devices) when their drive partition is created. A set amount of storage resources are reserved for each user, regardless of how much space they are actually using. As an example, consider an office with multiple users who each need up to 50 GB of network storage where the office has a 100 GB hard drive on the network. With thick provisioning, only two users could fit on the drive. Even if one user was merely using 10 GB of space, the user would still occupy half of the capacity of the drive. Thick provisioning allocates storage space up front in anticipation of future needs, which can cause inefficiency and wasted space. If users only fill up a small portion of their quota, the rest of the space on the drive remains unused. The business must pay to maintain this excess hard drive or solid state capacity, which takes up physical space, uses energy, and generates heat. On the other hand, the advantage of this pre-allocated space is that it guarantees there will be enough capacity available. The network will not run out of space even if both users approach their complete 50 GB quota. Moreover, thick provisioning causes no delay and no overhead in maneuvering shared physical storage space between several users.

Thin provisioning, also known as virtual provisioning or thin storage, is the rival disk provisioning method. Thin provisioning allocates disk space to users on demand based on how much space users need at any given time. As a user writes more data to the disk, the user will take up more of the physical capacity of the disk; when the user deletes data, the user's portion shrinks. Divisions on physical storage are virtual and flexible rather than determined in advance. Following the previous example, in a thin provision system, each user would only take up the amount of disk space the user is actually using. If the two users have each saved 10 GB of data into the disk (totaling 20 GB), 80 GB would remain free on the disk for other users. Therefore, the 100 GB drive can easily accommodate three or more users, each believing they have access to 50 GB of space. Essentially, the system claims to have more physical resources than are actually available. This is called "overprovisioning."

A logical to physical (L2P) table is implemented in SSD to hold the L2P address translation. The L2P table is commonly used in SSDs to support the nature of the flash memory technology. When the thin provisioning method is supported, the size of the L2P table is larger because the logical memory space is larger compared to the thick provisioning method.

The straightforward approach to support the thin provisioning method is to increase the size of the L2P table. In such an approach, the storage allocated for L2P tables is fully allocated to this purpose and not shared based on L2P utilization. It should be noted that in implementing the thin provisioning mode, the allocated L2P table should support the accumulated full logical address range as seen by all users. For example, in the running example mentioned above, for an office with multiple (e.g., 10) users who each needs up to 50 GB of network storage, the L2P table should cover a storage address space of 500 GB. However, as usually each user is typically using no more than 10 GB, the allocated L2P table will be mostly "empty". Stated another way, the L2P table will include mostly unused "holes" (which is a waste of expensive resource of DRAM).

Therefore, there is a need in the art for improved L2P table usage in thin provisioning mode.

SUMMARY OF THE DISCLOSURE

Logical to physical (L2P) tables are implemented in solid state drives (SSDs) to hold L2P address translations. In a thin provisioning or thin storage system, the L2P table is sized to support the total amount of memory that is available to be allocated on a per client or per host basis. During thin provisioning, the total amount of memory is not typically utilized. As such, the L2P table, which is sized to accommodate full usage of the memory allocated, is not fully utilized resulting in unused portions of the L2P table. The unused portions of the L2P table can be reallocated to use as temporal buffers until needed for write commands. Due to the reallocation, less buffers are needed.

In one embodiment, a data storage device comprises: a memory device; and a controller coupled to the memory device, wherein the controller is configured to: receive a write command; determine that a relevant logical to physical (L2P) entry was allocated to other usage; delay execution of the write command; determine that the relevant L2P entry has been released; and execute the write command.

In another embodiment, a data storage device comprises: a memory device; and a controller coupled to the memory device, wherein the controller is configured to: detect unused space within a logical to physical (L2P) table; allocate the unused space as temporal buffers; manage the unused space; and detect collisions in the unused space.

In another embodiment, a data storage device comprises: means to store data; and a controller coupled to the means to store data, wherein the controller is configured to: execute a thin provisioning method to allocate data storage within the means to store data, wherein the thin provisioning method comprises utilizing a logical to physical (L2P) table; detect that the L2P table has unused space; allocate the unused space as temporal buffers; delay execution of write commands associated with the unused space; and execute write commands associated with the unused space upon release of the unused space from use as a temporal buffer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Logical to physical (L2P) tables are implemented in solid state drives (SSDs) to hold L2P address translations. In a thin provisioning or thin storage system, the L2P table is sized to support the total amount of memory that is available to be allocated on a per client or per host basis. During thin provisioning, the total amount of memory is not typically utilized. As such, the L2P table, which is sized to accommodate full usage of the memory allocated, is not fully utilized resulting in unused portions of the L2P table. The unused portions of the L2P table can be reallocated to use as temporal buffers until needed for write commands. Due to the reallocation, less buffers are needed.

Figure 1:
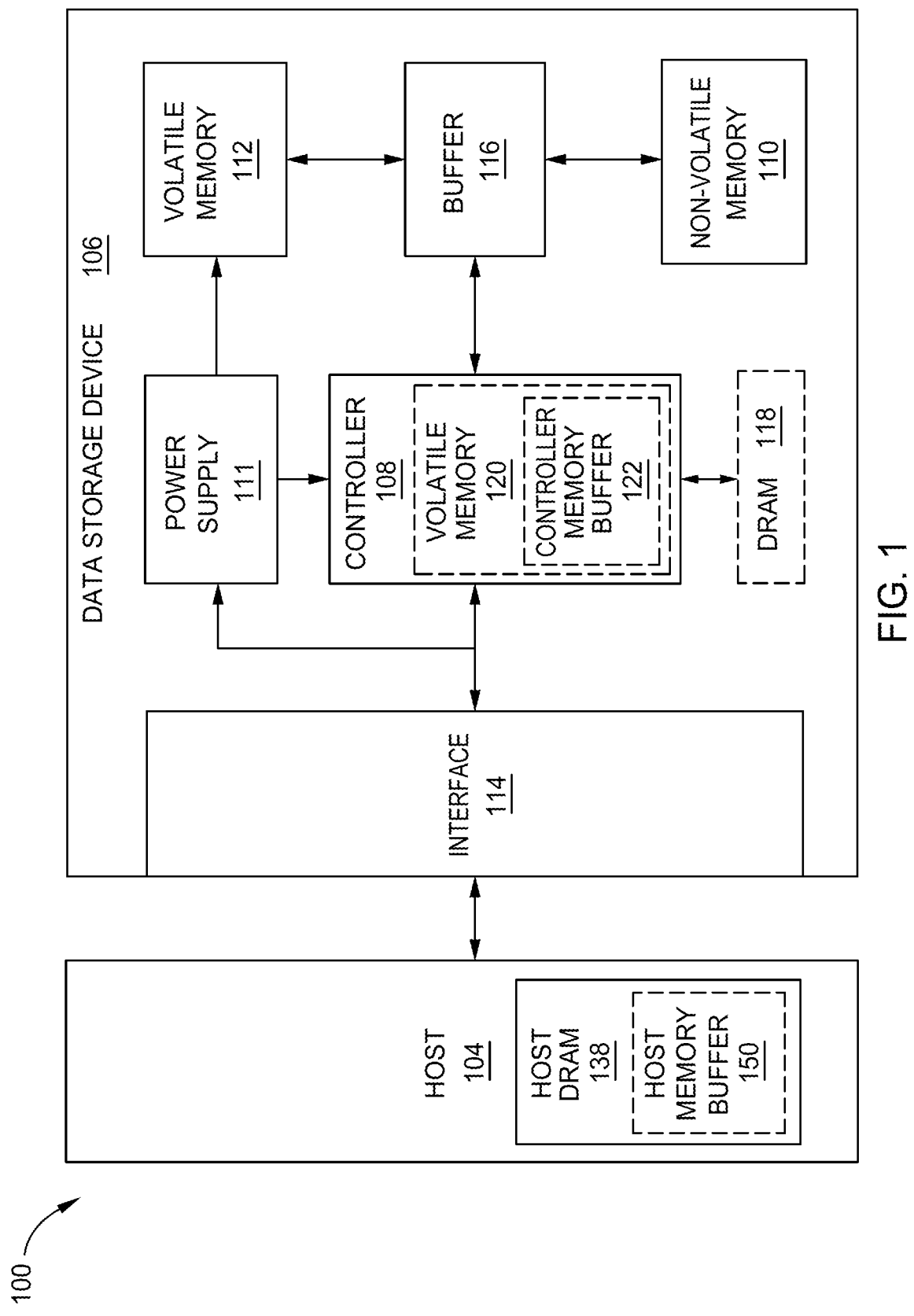
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of nonvolatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As will be discussed herein, the disclosure addresses the inefficiency of the L2P table in the mode of thin provisioning, and discloses an improved method that increases the efficiency of the storage allocated for L2P tables, which usually resides in DRAM. Resource sharing of the L2P table storage is proposed considering L2P utilization and trend.

The "holes" (i.e., unused L2P table storage) in the allocated L2P table will be managed and allocated as temporal buffers to the rest of the system. Those temporal buffers might be used as part of the data-path for having efficient data transfer, read-look-ahead buffers, XOR buffers or any other usage. The device controller manages the "holes" in the L2P table, detects collisions (i.e., the need to use "holes" for the L2P table when the "holes" have been reallocated), allocates those buffers to the rest of the system and manages the releases. The main advantage of the disclosure is in L2P table management efficiency when thin provisioning method is used. This efficiency contributes to performance, power, area, and cost gains.

Figure 2:
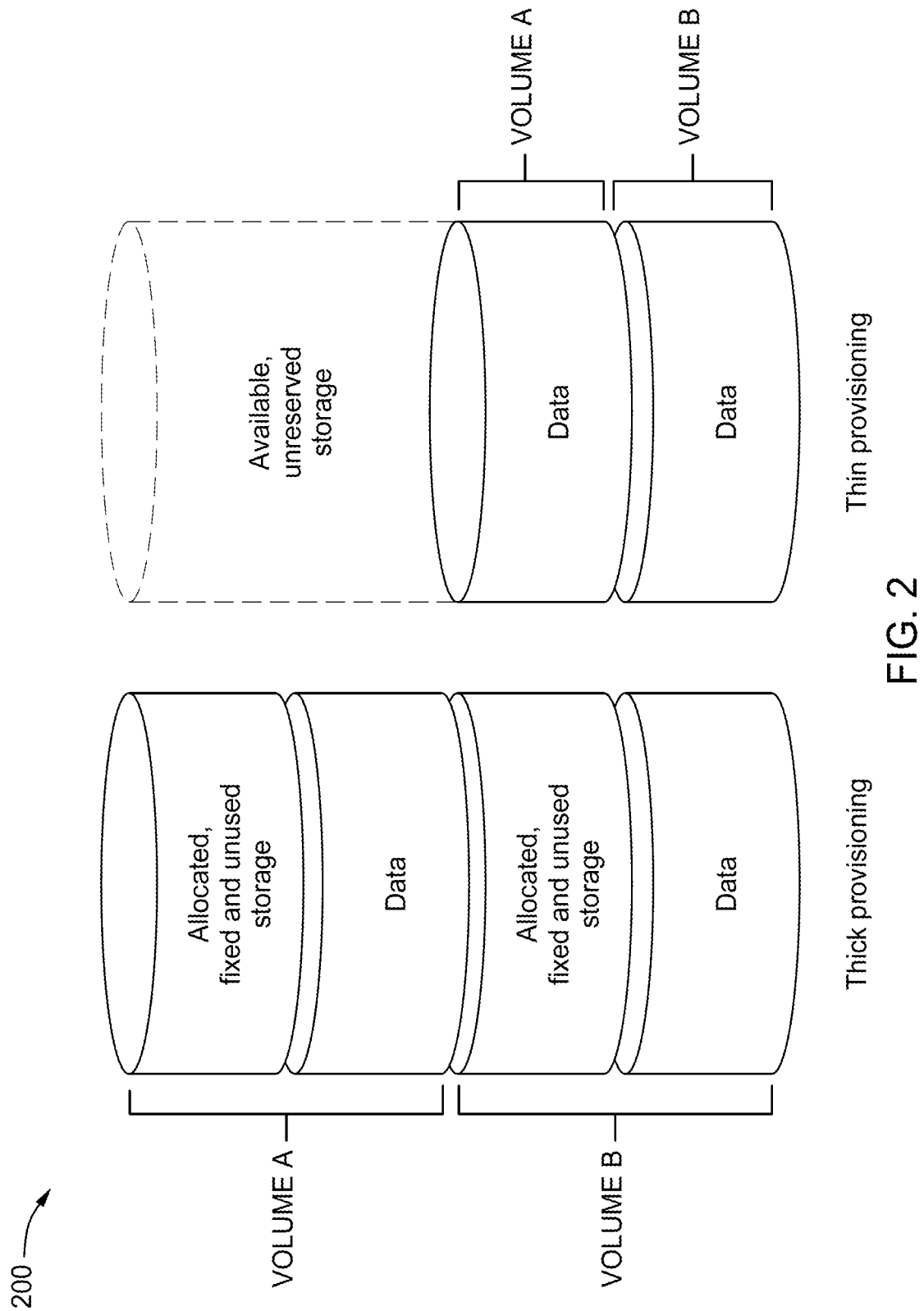
FIG. 2 is a schematic illustration of thick provisioning and thin provisioning.

FIG. 2 is a schematic illustration 200 of thick provisioning and thin provisioning and depicts the L2P management used in a thin provisioning method. In FIG. 2, it is shown that for thick provisioning, two volumes are allocated, Volume A and Volume B. However, for both Volume A and Volume B, there is some data, but also a non-negligible unused storage. The unused storage is allocated and cannot be reallocated. When the memory is allocated in thick provisioning, usually at initialization, the allocated amount of memory is fixed. If Volume A is allocated to User A and Volume B is allocated to User B, Users A and B can do whatever is desired for the allocated memory. Even if User A, for example, uses only ten percent of the allocated memory, all of the rest would be still allocated to User A and thus the unused storage would not be usable by any other user. Hence, in the thick provisioning shown in FIG. 2, there is a large waste of storage.

In thin provisioning, the allocating is not done at initialization, but rather, occurs just before usage. In the thin provisioning illustration in FIG. 2, Volume A and Volume B are only the size that meets the current needs of User A and User B. The unused storage is allocated for a free pool and whenever a User A or User B needs to write more data to the memory device, more memory can be allocated to User A or User B.

Expanding upon the example for thin provisioning, if the total memory device capacity is 100 GB and there are two users, User A and User B, then at the beginning of life (i.e., initialization phase) for the memory device, 100 GB is advertised to both User A and User B. Thus, 200 GB in total is advertised even though the physical capacity is only 100 GB. However, each user (i.e., User A and User B) is told that the 100 GB capacity is allocated for them. Users A and B will then start using the memory device and the benefit of having 100 GB available. Even if User A is provisioned only 1 GB due to actual usage, the management table (i.e., L2P table) will need to be sized to handle 100 GB. Because both User A and User B are advertised 100 GB each (even though in actuality there is only 100 GB in total, not 200 GB in total), the L2P table will need to be double in size. In other words, the L2P table will need to handle a capacity of 200 GB. Stated another way, by advertising 100 GB to each of User A and User B, the logical address space has doubled and hence, the L2P table will need to be doubled in capacity too (compared to thick provisioning). The L2P table is typically stored in volatile memory, such as DRAM or SRAM, or HMB, which can be very expensive so doubling the logical space needed when operating in a thin provisioning environment can be costly. Adding more volatile memory is an option, but an expensive option, and utilizes more real estate on a data storage device.

The disclosure herein discusses how to more efficiently manage the L2P table usage without the need to add additional storage to accommodate a larger L2P table. Since not all of the memory is utilized, not all of the L2P table is utilized. The unused memory is a "hole" in the L2P table, which indicates the unused memory in the memory device. Logic is used to detect the "holes" in the L2P table. The "holes" are the pieces or entries of the L2P table that are not currently in use. The unused L2P table pieces or entries can then be used for other purposes such as for internal or intermediate buffers that can lead to better performance and better quality of service (QOS). Additionally, the unused memory can be used for XOR buffers. Instead of using the memory device (e.g., NAND) to store and manipulate complex flows, the "holes" in the L2P table can be used which leads to more efficiency, better performance, better power usage, better QoS, and better usage of the memory device (e.g., NAND) while still supporting the thin provisioning method. Stated another way, instead of wasting the "holes", the "holes" will be used.

Figure 3:
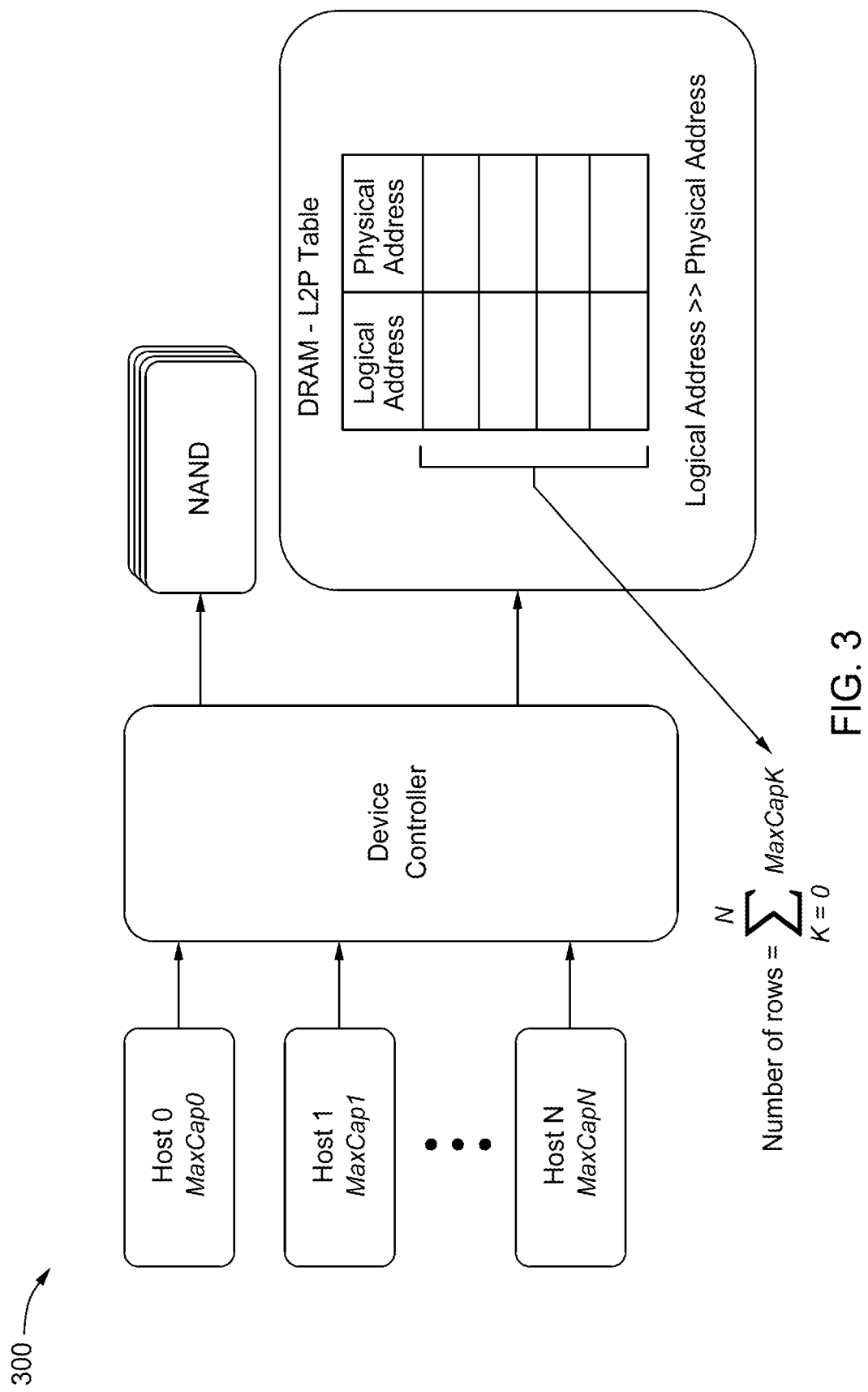
FIG. 3 is a schematic illustration of L2P management in a thin provisioning method.

FIG. 3 is a schematic illustration 300 of L2P management in a thin provisioning method. The memory device may interact with multiple hosts while allowing maximum capacity for each host, and the values may be different per host. The device controller manages the L2P table which, in one embodiment, resides in DRAM. The address of the L2P table represents the logical address while the data represents the memory device (e.g., NAND) physical address.

The assumption is that the logical address space is much larger than the physical address space. This is the assumption in the case of thin provisioning. The number of required rows in the L2P table is equal to the total maximum capacity allocated to the host while having the assumption that in normal usage the L2P table will have many "holes" since the probability that all hosts will utilize its maximum capacity altogether at the same time is negligible.

In FIG. 3, multiple host devices (e.g., Host 0, Host 1, and Host N) are shown with each host device having its own maximum capacity. Assuming the maximum capacity of the memory device (e.g., NAND) is advertised to each host device, the total advertised would be greater than the actual total memory capacity. As such, the L2P table will need to increase to match the total advertised memory capacity. The equation shown in FIG. 3 is for calculating the total number of rows needed in the L2P table, which is equal to the maximum capacity advertised to all host devices collectively. Because thin provisioning is used, the L2P table will be rather large.

Figure 4:
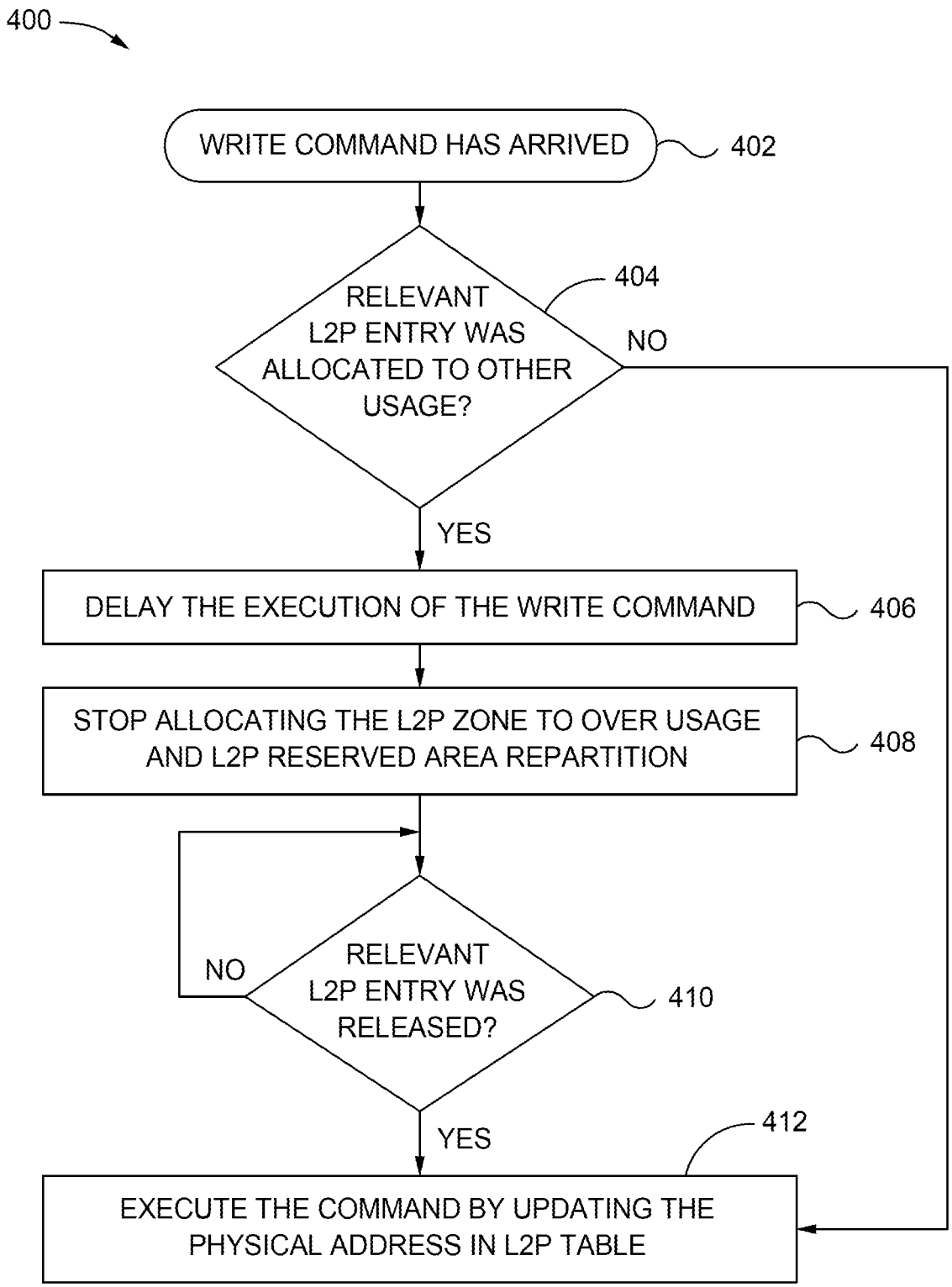
FIG. 4 is a flowchart illustrating write command scheduling according to one embodiment.

FIG. 4 is a flowchart 400 illustrating write command scheduling according to one embodiment. It is to be noted that for read commands, there is no issue because for a read command, the memory has already been allocated (and hence used). When a write command has arrived at block 402, the write command could start the execution phase only after making sure that the relevant L2P entry is not used for other purposes. At block 404, the relevant L2P entry is checked to see if the relevant L2P entry has been allocated for other usage. If the relevant L2P entry was allocated to other usage, the execution of this write command is delayed at block 406 until the buffer is released back for use as an L2P entry. The delay is necessary because overwriting the entry in the L2P table is not possible because the memory location is not available at that point in time.

However, if the relevant L2P entry is not allocated to other usage at 404, then the write command can be executed at block 412 by updating the physical address in the L2P table. Once the write command execution is delayed at block 406, the logic also updates the internal logic to stop allocating this L2P entry to other usages at block 408 and it might be done by L2P "reserved-area" repartition. While it is desirable to free the relevant L2P entry as soon as possible to be able to execute the write command, care also must be taken to ensure the relevant L2P entry is not allocated for other usage after being freed. Therefore, the relevant L2P entry can be marked so that the relevant L2P entry will not be reallocated for other usage. The marking can occur prior to the relevant L2P entry being freed.

A determination is then made at block 410 regarding whether the relevant L2P entry has been released. If not yet released, then the waiting continues, but if the relevant L2P entry has been released, then the method proceeds to block 412.

Figure 5:
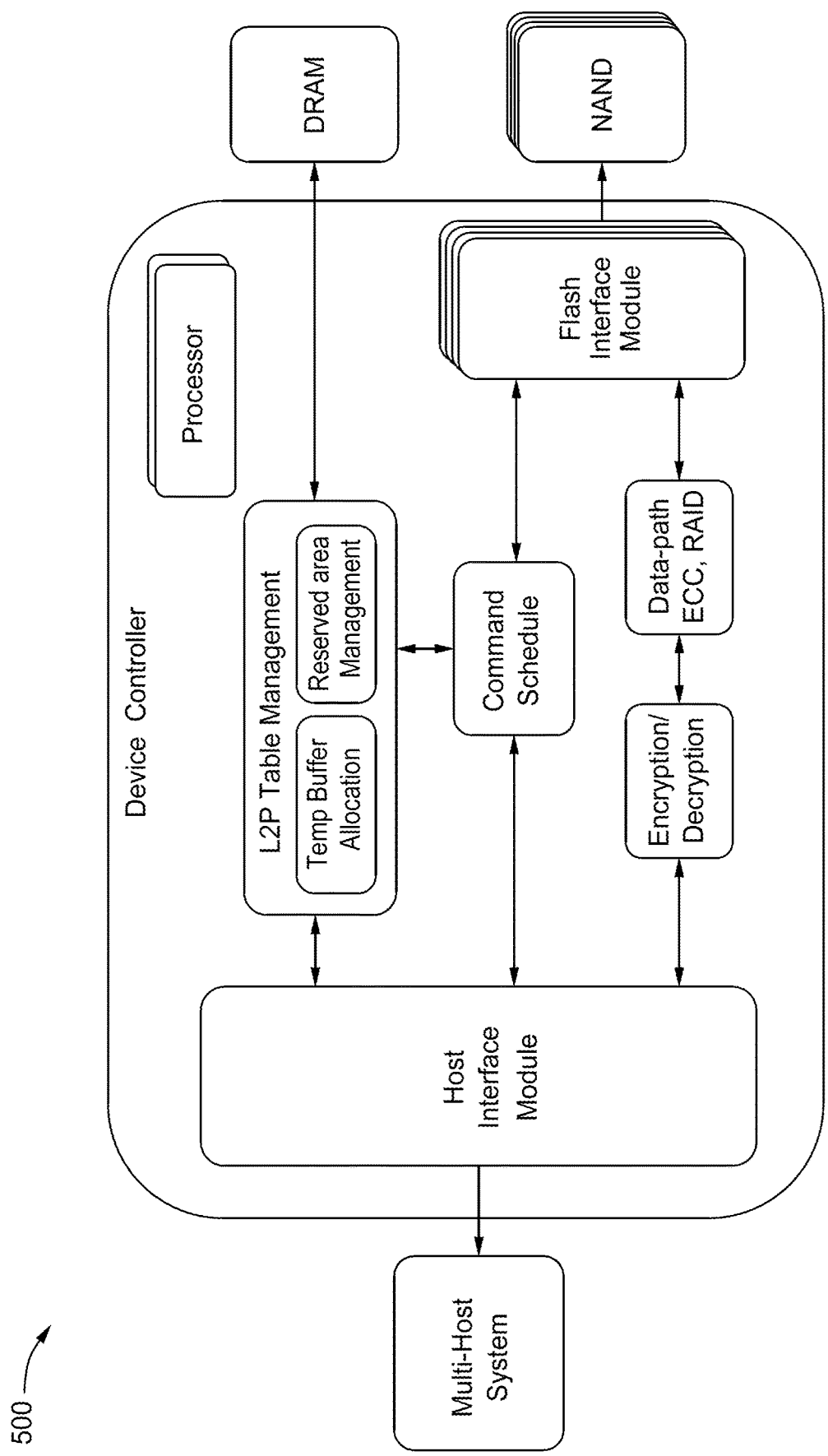
FIG. 5 is a schematic illustration of a system for L2P management according to one embodiment.

FIG. 5 is a schematic illustration of a system for L2P management according to one embodiment and depicts the high-level block diagram of the system 500 discussed herein. In the system 500, multiple host devices are present as is at least one volatile memory device (e.g., DRAM) and at least one nonvolatile memory device (e.g., NAND). The hosts are connected to the device controller through a host interface module (HIM) while the nonvolatile memory device is connected to the device controller through a flash interface module (FIM). The controller has one or more processors that contain circuitry to implement the program/method discussed herein. Both the FIM and HIM are coupled together through a command scheduler. Additionally, an encryption/decryption module is coupled to the HIM while a datapath containing the error correction (ECC) module and redundant array of inexpensive disks (RAID) is coupled to the FIM. The encryption/decryption module is coupled to the datapath. The command scheduler is also coupled to a L2P table management module that includes a reserved area management module and a temporal buffer allocation module. The L2P table management module is coupled to the volatile memory and the HIM. The reserved area management module is responsible for detecting the "holes" in the L2P table and then selects the "holes" that are to be reallocated for other purposes. The temporal buffer allocation module (oftentimes referred to as a temp buffer allocation module) will allocate buffers from the L2P table for use temporarily as storage other than L2P table data (e.g., XOR operations), and once the buffer is free will send the buffers back to the reserved area management module for use in L2P operations.

In one embodiment, the L2P table management module is logic that is responsible for managing the "holes" in the L2P table and sharing those zones for other purposes such as temporal data-path buffer allocation. The logic is also responsible for allowing the execution of the new arrived write commands to avoid collision as described in the flowchart of FIG. 4.

In one embodiment, the execution of the write command is partially delayed. The write data is transferred from a host device to intermediate buffers that reside in the device and even a completion may be posted to the Host. Only the allocation of the physical address, updating the L2P table, and writing to the NAND operations are delayed. In this case, the impact on the host device is minimal. More specifically, execution of the write command can being even though the associated L2P entry is allocated. In that case, data will transfer from the host device to the data storage device, but the data will not be written to the nonvolatile memory (e.g., NAND). Rather, the data will be held to be written once the relevant L2P entry is available and only then will the data be written to the nonvolatile memory. Stated another way, execution of the write command does not need to be completely delayed in one embodiment. In such a scenario, a completion notification can even be sent to the host device prior to writing the data to the nonvolatile memory.

Figure 6:
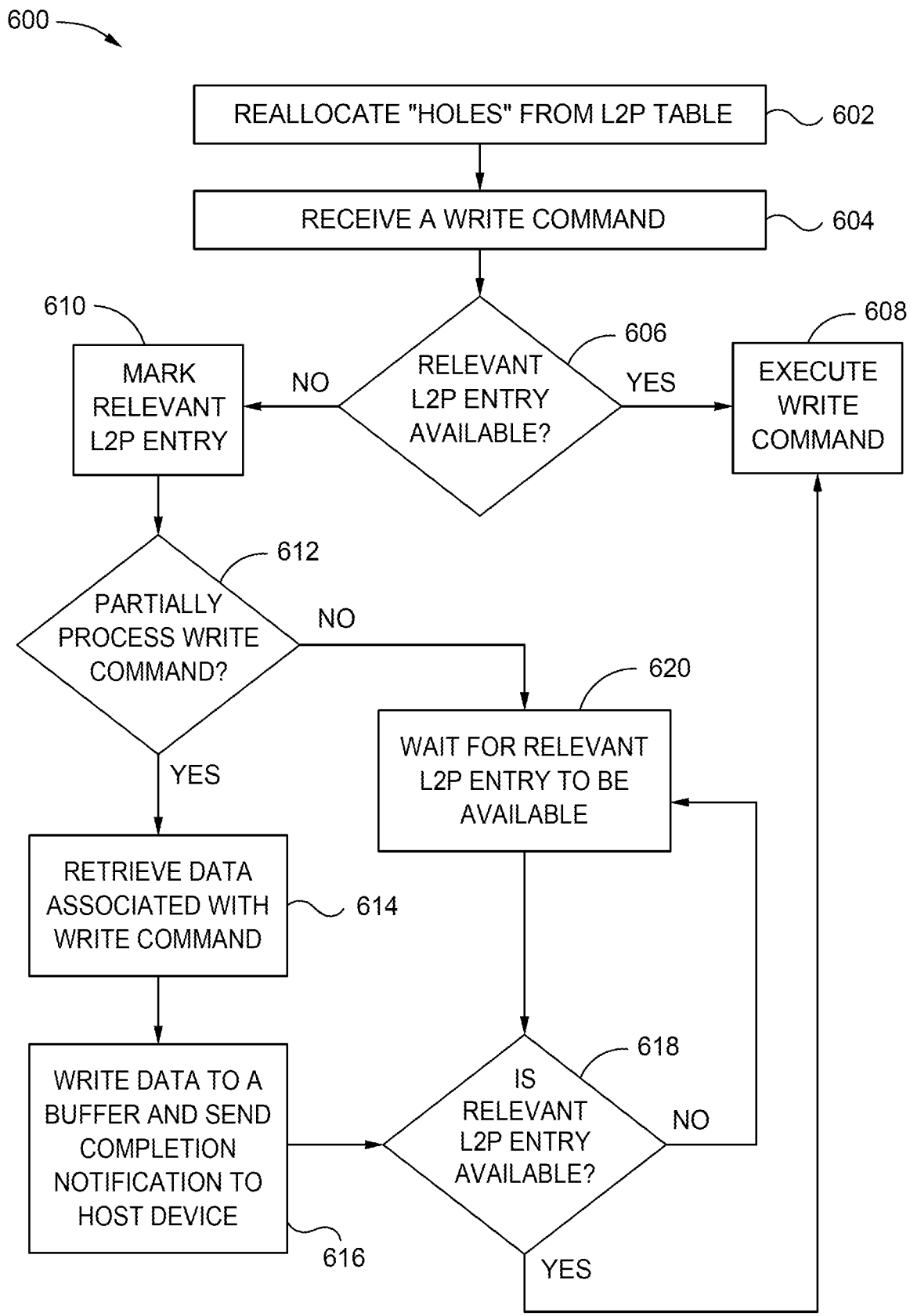
FIG. 6 is a flowchart illustrating write command scheduling in a thin provisioning operating environment.

FIG. 6 is a flowchart 600 illustrating write command scheduling in a thin provisioning operating environment. The method begins reallocating "holes" in a L2P table for other usage at 602. Thereafter, a write command is received at block 604. A determination must then be made at block 606 regarding whether the relevant L2P entry is available or has been reallocated. If the relevant L2P entry is available, then the write command is executed at block 608. If the relevant L2P entry is not available at block 606, then the relevant L2P entry is marked to ensure that when the relevant L2P entry is available, the relevant L2P entry will not be reallocated again due to the fact that the relevant L2P entry is needed to process a write command.

Thereafter, a decision is made regarding whether to partially process the write command at 612. If partially processing the write command is acceptable, then the data is retrieved at block 614 then written to a buffer at block 616. A completion notification for the write command may be sent to the host device. Thereafter, a determination is made regarding whether the relevant L2P entry is now available at block 618. If the relevant L2P entry is available, then the write command is completed at block 608 by writing the data to the memory device and updating the relevant L2P entry. If the relevant L2P entry is not available at block 618, then the waiting continues at block 620. If partially processing the write command is not acceptable at block 612, then the wait is on for the relevant L2P entry to be available at block 620. After the waiting at block 620, then a determination is made regarding whether the relevant L2P entry is now available at block 618.

The main advantage of the disclosure is in L2P table management efficiency when a thin provisioning method is used. This efficiency contributes to performance, power, area, and cost gains. The more efficient, the less other buffers are needed in the system. Less buffers means less power, area, and cost.

In one embodiment, a data storage device comprises: a memory device; and a controller coupled to the memory device, wherein the controller is configured to: receive a write command; determine that a relevant logical to physical (L2P) entry was allocated to other usage; delay execution of the write command; determine that the relevant L2P entry has been released; and execute the write command. The other usage is selected from the group consisting of: part of a data path, a read look ahead (RLA) buffer, an exclusive or (XOR) buffer, and combinations thereof. The controller comprises a L2P table management module. The L2P table management module includes a temporal buffer allocation unit and a reserved area management unit. The temporal buffer allocation unit is configured to allocate the relevant L2P entry. The reserved area management unit is configured to perform: the determining that the relevant L2P entry was allocated to other usage; and the determining that the relevant L2P entry has been released. After the delaying and before the executing, the controller is configured to transfer data associated with the write command to intermediate buffers of the data storage device. After the delaying and transferring, and before the executing, the controller is configured to post a write command completion notification for the write command to a host device. The controller is configured to execute a thin provisioning method to allocate data storage. The L2P entry is disposed in dynamic random access memory (DRAM).

In another embodiment, a data storage device comprises: a memory device; and a controller coupled to the memory device, wherein the controller is configured to: detect unused space within a logical to physical (L2P) table; allocate the unused space as temporal buffers; manage the unused space; and detect collisions in the unused space. The controller is configured to allocate data storage to a plurality of host devices. The L2P table is sized to accommodate a number logical addresses greater than a total amount of available memory. The L2P table is sized to accommodate thin provisioning. The controller is configured to stop the allocating in response to the detecting collisions. The controller is configured to delay execution of a write command associated with a collision. Managing the unused space comprises releasing the unused space from use as a temporal buffer.

In another embodiment, a data storage device comprises: means to store data; and a controller coupled to the means to store data, wherein the controller is configured to: execute a thin provisioning method to allocate data storage within the means to store data, wherein the thin provisioning method comprises utilizing a logical to physical (L2P) table; detect that the L2P table has unused space; allocate the unused space as temporal buffers; delay execution of write commands associated with the unused space; and execute write commands associated with the unused space upon release of the unused space from use as a temporal buffer. A number of rows of the L2P table is equal to a maximum capacity of the means to store data. The controller is configured to stop allocating the unused space associated with the write commands.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive a write command;
   determine that a relevant logical to physical (L2P) entry was allocated to other usage, wherein the other usage is selected from the group consisting of: part of a data path, a read look ahead (RLA) buffer, an exclusive or (XOR) buffer, and combinations thereof;
   delay execution of the write command;
   determine that the relevant L2P entry has been released; and
   execute the write command.

2. The data storage device of claim 1, wherein the controller comprises a L2P table management module.

3. The data storage device of claim 2, wherein the L2P table management module includes a temporal buffer allocation unit and a reserved area management unit.

4. The data storage device of claim 3, wherein the temporal buffer allocation unit is configured to allocate the relevant L2P entry.

5. The data storage device of claim 4, wherein the reserved area management unit is configured to perform:
   the determining that the relevant L2P entry was allocated to other usage; and
   the determining that the relevant L2P entry has been released.

6. The data storage device of claim 1, wherein after the delaying and before the executing, the controller is configured to transfer data associated with the write command to intermediate buffers of the data storage device.

7. The data storage device of claim 6, wherein after the delaying and transferring, and before the executing, the controller is configured to post a write command completion notification for the write command to a host device.

8. The data storage device of claim 1, wherein the controller is configured to execute a thin provisioning method to allocate data storage.

9. The data storage device of claim 1, wherein the L2P entry is disposed in dynamic random access memory (DRAM).

10. A data storage device, comprising:
    a memory device; and
    a controller coupled to the memory device, wherein the controller is configured to:
    detect unused space within a logical to physical (L2P) table;
    allocate the unused space as temporal buffers;
    manage the unused space; and
    detect collisions in the unused space, wherein the controller comprises a L2P table management module, and wherein the L2P table management module includes a temporal buffer allocation unit and a reserved area management unit.

11. The data storage device of claim 10, wherein the controller is configured to allocate data storage to a plurality of host devices.

12. The data storage device of claim 11, wherein the L2P table is sized to accommodate a number logical addresses greater than a total amount of available memory.

13. The data storage device of claim 12, wherein the L2P table is sized to accommodate thin provisioning.

14. The data storage device of claim 10, wherein the controller is configured to stop the allocating in response to the detecting collisions.

15. The data storage device of claim 10, wherein the controller is configured to delay execution of a write command associated with a collision.

16. The data storage device of claim 10, wherein managing the unused space comprises releasing the unused space from use as a temporal buffer.

17. A data storage device, comprising:
    means to store data; and
    a controller coupled to the means to store data, wherein the controller is configured to:
    execute a thin provisioning method to allocate data storage within the means to store data, wherein the thin provisioning method comprises utilizing a logical to physical (L2P) table;
    detect that the L2P table has unused space;
    allocate the unused space as temporal buffers;
    delay execution of write commands associated with the unused space; and
    execute write commands associated with the unused space upon release of the unused space from use as a temporal buffer, wherein after the delaying and before the executing, the controller is configured to transfer data associated with write commands to intermediate buffers of the data storage device.

18. The data storage device of claim 17, wherein a number of rows of the L2P table is equal to a maximum capacity of the means to store data.

19. The data storage device of claim 17, wherein the controller is configured to stop allocating the unused space associated with the write commands.

* * * * *